United States Patent
Au et al.

(10) Patent No.: US 8,230,174 B2
(45) Date of Patent: Jul. 24, 2012

(54) MULTI-QUEUE ADDRESS GENERATOR FOR START AND END ADDRESSES IN A MULTI-QUEUE FIRST-IN FIRST-OUT MEMORY SYSTEM

(75) Inventors: Mario Au, Fremont, CA (US); Jason Z. Mo, Fremont, CA (US); Xiaoping Fang, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1924 days.

(21) Appl. No.: 11/040,926

(22) Filed: Jan. 21, 2005

(65) Prior Publication Data

US 2006/0020743 A1    Jan. 26, 2006

Related U.S. Application Data

(60) Provisional application No. 60/591,499, filed on Jul. 26, 2004, provisional application No. 60/600,347, filed on Aug. 9, 2004.

(51) Int. Cl.
*G06F 12/00* (2006.01)
*G06F 13/00* (2006.01)

(52) U.S. Cl. ........ 711/129; 711/100; 711/136; 711/154; 711/173

(58) Field of Classification Search ............... 711/136; 710/52

See application file for complete search history.

(56) References Cited

U.S. PATENT DOCUMENTS

| | | | |
|---|---|---|---|
| 4,486,854 A | 12/1984 | Yuni | |
| 4,873,666 A | 10/1989 | Lefebvre et al. | |
| 4,888,739 A | 12/1989 | Frederick et al. | |
| 5,079,693 A | 1/1992 | Miller | |
| 5,600,820 A * | 2/1997 | Johnston | 711/171 |
| 6,044,418 A * | 3/2000 | Muller | 710/56 |
| 6,145,061 A * | 11/2000 | Garcia et al. | 711/154 |
| 6,381,659 B2 | 4/2002 | Proch et al. | |
| 6,525,980 B1 | 2/2003 | Au et al. | |
| 6,567,094 B1 | 5/2003 | Curry et al. | |
| 6,629,226 B1 | 9/2003 | Paul et al. | |
| 6,631,455 B1 | 10/2003 | Raza et al. | |
| 6,745,264 B1 * | 6/2004 | Luke et al. | 710/52 |
| 6,757,679 B1 * | 6/2004 | Fritz | 707/8 |
| 6,795,360 B2 | 9/2004 | Duh et al. | |
| 6,947,437 B1 * | 9/2005 | Erimli et al. | 370/418 |
| 7,093,037 B2 * | 8/2006 | Duckman | 710/52 |
| 2002/0080672 A1 | 6/2002 | Lee et al. | |
| 2003/0018862 A1 | 1/2003 | Karnstedt et al. | |
| 2003/0034797 A1 | 2/2003 | Bentz | |
| 2003/0120842 A1 * | 6/2003 | Bace | 710/57 |

FOREIGN PATENT DOCUMENTS

JP     2004-139377 A    5/2004

* cited by examiner

*Primary Examiner* — Tuan V. Thai
(74) *Attorney, Agent, or Firm* — Bever, Hoffman & Harms

(57) ABSTRACT

A multi-queue FIFO memory device that uses existing pins of the device to load a desired number of queues (N) into a queue number register is provided. The queue number register is coupled to a queue size look-up table (LUT), which provides a queue size value in response to the contents of the queue number register. The queue size value indicates the amount of memory (e.g., the number of memory blocks) to be included in each of the N queues. The queue size value is provided to a queue start/end address generator, which automatically generates the start and end address associated with each queue in response to the queue size value. These start and end addresses are stored in queue address register files, which enable proper memory read/write and flag counter operations.

17 Claims, 4 Drawing Sheets

| QNUM | MEMORY BLOCKS PER QUEUE (QSIZE) |
|---|---|
| 0 | 512 |
| 1 | 256 |
| 2 | 170 |
| 3 | 128 |
| 4 | 102 |
| 5 | 85 |
| 6 | 73 |
| 7 | 64 |
| 8 | 56 |
| 9 | 51 |
| 10 | 46 |
| 11 | 42 |
| 12 | 39 |
| 13 | 36 |
| 14 | 34 |
| 15 | 32 |
| 16 | 30 |
| 17 | 28 |
| 18 | 26 |
| 19 | 25 |
| 20 | 24 |
| 21 | 23 |
| 22 | 22 |
| 23 | 21 |
| 24 | 20 |
| 25 | 19 |
| 26-27 | 18 |
| 28-29 | 17 |
| 30-31 | 16 |
| 32-33 | 15 |

| QNUM | MEMORY BLOCKS PER QUEUE (QSIZE) |
|---|---|
| 34-35 | 14 |
| 36-38 | 13 |
| 39-41 | 12 |
| 42-44 | 11 |
| 45-50 | 10 |
| 51-55 | 9 |
| 56-63 | 8 |
| 64-72 | 7 |
| 73-84 | 6 |
| 85-101 | 5 |
| 102-107 | 4 |

FIG. 4

MULTI-QUEUE ADDRESS GENERATOR FOR START AND END ADDRESSES IN A MULTI-QUEUE FIRST-IN FIRST-OUT MEMORY SYSTEM

RELATED APPLICATIONS

The present application is related to, and incorporates by reference, U.S. Provisional Patent Application Ser. No. 60/591,499 filed by Mario Au, Jason Z. Mo, Xiaoping Fang, Hui Su, Cheng-Han Wu, Ta-Chung Ma and Lan Lin on Jul. 26, 2004. The present application is also related to, and incorporates by reference, U.S. Provisional Patent Application Ser. No. 60/600,347 filed by Mario Au, Jason Z. Mo, Xiaoping Fang, Hui Su, Cheng-Han Wu, Ta-Chung Ma and Lan Lin on Aug. 9, 2004.

The present application is also related to, and incorporates by reference, the following commonly owned, co-filed U.S. Patent Applications.

U.S. patent application Ser. No. 11/040,892, entitled "Multiple Counters to Relieve Flag Restriction in a Multi-Queue First-In First-Out Memory System" by Mario Au and Jason Z. Mo.

U.S. patent application Ser. No. 11/040,895, now U.S. Pat. No. 7,099,231, entitled "Interleaving Memory Blocks to Relieve Timing Bottleneck in a Multi-Queue First-In First-Out Memory System" by Mario Au, Jason Z. Mo, Ta-Chung Ma and Lan Lin.

U.S. patent application Ser. No. 11/040,637, entitled "Mark/Re-Read and Mark/Re-Write Operations in a Multi-Queue First-In First-Out Memory System" by Mario Au and Jason Z. Mo.

U.S. patent application Ser. No. 11/040,896, entitled "Partial Packet Read/Write and Data Filtering in a Multi-Queue First-In First-Out Memory System" by Mario Au, Jason Z. Mo and Hui Su.

U.S. patent application Ser. No. 11/040,804, now U.S. Pat. No. 7,257,687, entitled "Synchronization of Active Flag and Status Bus Flags in a Multi-Queue First-In First-Out Memory System" by Mario Au, Jason Z. Mo and Cheng-Han Wu.

U.S. patent application Ser. No. 11/040,893, entitled "Status Bus Accessing Only Available Quadrants During Loop Mode Operation in a Multi-Queue First-In First-Out Memory System" by Mario Au, Jason Z. Mo and Cheng-Han Wu.

U.S. patent application Ser. No. 11/040,927, now U.S. Pat. No. 7,154,327, entitled "Self-Timed Multiple Blanking For Noise Suppression During Flag Generation in a Multi-Queue First-In First-Out Memory System" by Mario Au and Jason Z. Mo.

FIELD OF THE INVENTION

The present invention relates to a multi-queue first in, first out (FIFO) memory.

PRIOR ART

A conventional multi-queue FIFO memory system typically includes a large memory, which is logically partitioned into a plurality of queues during the initialization of the system. Conventional multi-queue FIFO memory systems use programming software on a remote device to generate a bit stream that identifies all of the queue start and end addresses and selects the number of queues to be implemented in the multi-queue FIFO memory system. This bit stream is stored in memory external to the multi-queue FIFO memory system, and is re-sent upon initialization of the multi-queue FIFO memory system. There is no local flexibility available to program the FIFO queues. Furthermore, the bit stream is sent in a serial fashion to the multi-queue FIFO memory system for configuration. The serial bit stream initialization consumes external programming resources. The serial bit stream initialization also consumes additional logic and time for handshaking logic and communication of the bit stream.

Alternately, the queues of a multi-queue FIFO memory system can be set to a default setting, wherein the number of queues is set to the maximum number of available queues, and the size of each queue is equal. For example, a multi-queue FIFO memory system having a capacity of X Mbytes and having 128 total possible queues would be set to have 128 queues, each with a capacity of X/128. Two pins of the system are typically dedicated to implementing the default setting, one pin to activate the default mode, and the other pin to enable the default setting.

It would therefore be desirable to have an improved method and structure for initializing the queues of a multi-queue FIFO memory system.

SUMMARY

Accordingly, the present invention provides a multi-queue FIFO memory device that uses existing pins of the device to load a desired number of queues (N) into a queue number register. The queue number register is coupled to a queue size look-up table (LUT), which provides a queue size value in response to the contents of the queue number register. The queue size value indicates the amount of memory (e.g., the number of memory blocks) to be included in each of the N queues. The queue size value is provided to a queue start/end address generator, which automatically generates the start and end address associated with each queue in response to the queue size value. These start and end addresses are stored in queue address register files, which enable proper memory read/write and flag counter operations.

In accordance with another embodiment, the programming method of the present invention can expanded to simultaneously and independently control the queue programming in more than one multi-queue FIFO memory system.

The present invention will be more fully understood in view of the following description and drawings.

BRIEF DESCRIPTION OF THE DRAWINGS

FIG. 4 is a block diagram illustrating the configuration of a queue size look-up table in accordance with one embodiment of the present invention.

DETAILED DESCRIPTION

The present invention includes a multi-queue flow-control device, which is implemented on a single chip. The multi-queue device can be configured to implement between 1 and 128 discrete FIFO queues. The user has full flexibility configuring queues within the device, being able to program the total number of queues between 1 and 128. The user can also independently select the individual queue depths.

All queues within the device have a common data input bus (write port), and a common data output bus (read port). Data written to the write port is directed to a respective queue via an internal de-multiplexer, which is addressed by a user. Data read from the read port is accessed from a respective queue via an internal multiplexer, addressed by the user. Data writes and reads can be performed at high speeds (up to 200 MHz, with access times of 3.6 ns in accordance with one embodiment of the present invention). Data write and read operations are totally independent of each other. Thus, a queue may be selected on the write port, and a different queue may be selected on the read port. Alternately, read and write operations may be selected on the same queue simultaneously.

The device provides a Full Flag (FF#) and an Empty Flag (EF#) that identify the status of the queues selected for write and read operations, respectively. The device also provides a Programmable Almost Full Flag (PAF#) and a Programmable Almost Empty Flag (PAE#) that identify the status of the queues selected for write and read operations, respectively. The positions of the PAF# and PAE# flags are programmable by the user. The flags for queue N are specified by the flag name, followed by N (e.g., PAF#_N).

Figure 1:
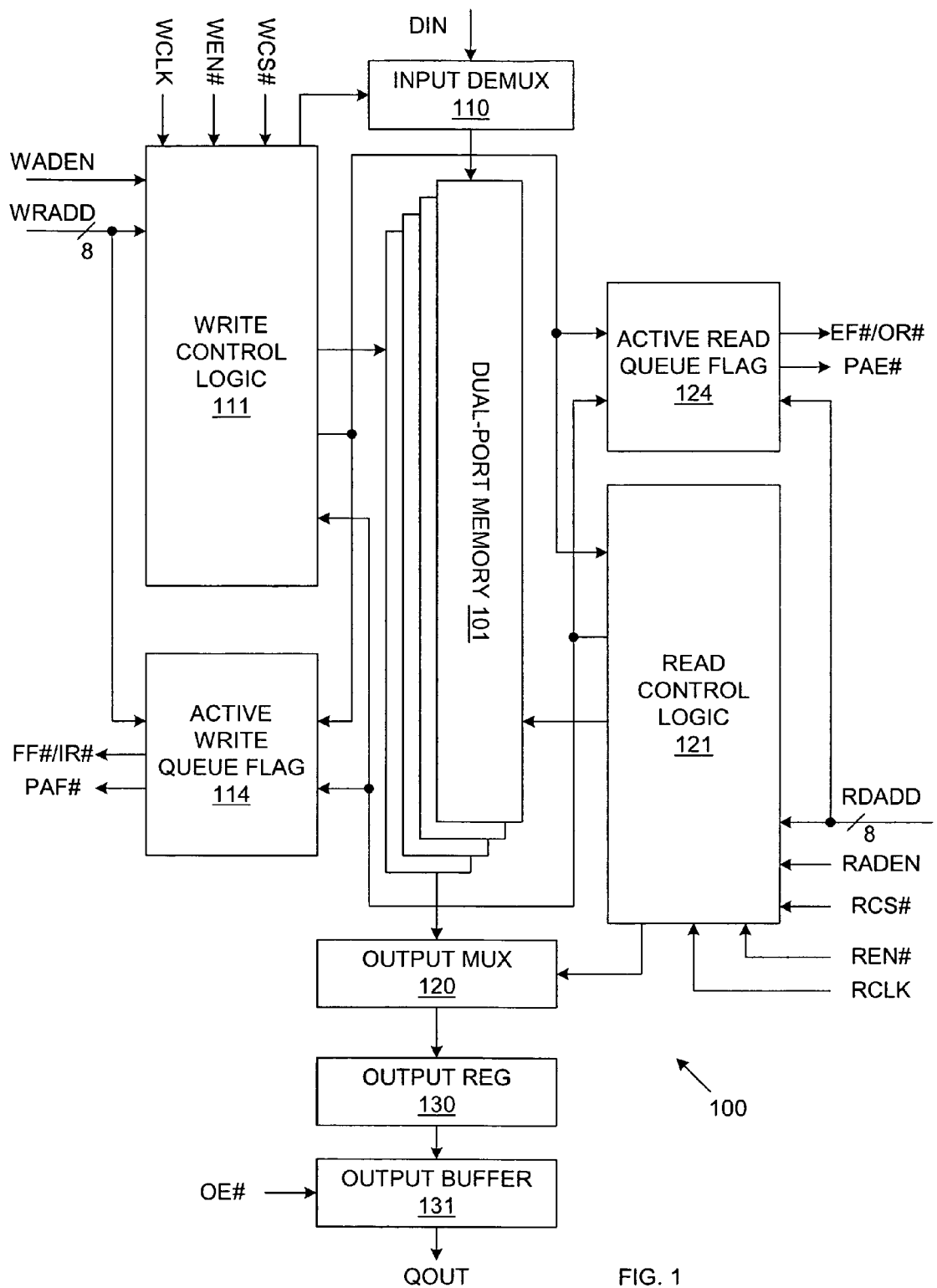
FIG. 1 is a block diagram of a multi-queue flow-control device in accordance with one embodiment of the present invention.

FIG. 1 is a block diagram of a multi-queue flow-control device 100 in accordance with one embodiment of the present invention. Device 100 includes dual-port memory 101, write port (de-multiplexer) 110, write control logic 111, active write queue flag circuit 114, output multiplexer 120, read control logic 121, active read queue flag circuit 124, output register 130 and output buffer 131. In the described embodiment, dual-port memory is a 4.7 Mbit memory having 512 memory blocks, each with a 9.4 kbit capacity. The 4.7 Mbit memory can be logically divided into up to 128 FIFO queues, each having a minimum capacity of 9 k bits.

In general, write control logic 111 controls write accesses to the various queues in dual-port memory 101. More specifically, write control logic 111 provides the required control/address signals to input de-multiplexer 110 and dual-port memory 101 in response to a write chip select signal WCS#, a write enable signal WEN#, a write clock signal WCLK, a write address signal WRADD[7:0] and a write address enable signal WADEN. Write control logic 111 also provides control signals to active write queue flag circuit 114, active read queue flag circuit 124 and read control logic 121.

Similarly, read control logic 121 controls read accesses from the various queues in dual-port memory 101. More specifically, read control logic 121 provides the required control/address signals to output multiplexer 120 and dual-port memory 101 in response to a read chip select signal RCS#, a read enable signal REN#, a read clock signal RCLK, a read address signal RDADD[7:0] and a read address enable signal RADEN. Read control logic 121 also provides control signals to active write queue flag circuit 114, active read queue flag circuit 124 and write control logic 111.

Active write queue flag circuit 114 generates a full flag FF# (input ready flag IR#) and programmable almost full flag PAF# in response to the write address WRADD[7:0] and the control signals received by write control logic 111 and read control logic 121. Also, active read queue flag circuit 124 generates an empty flag EF# (output ready flag OR#) and programmable almost empty flag PAE# in response to the read address RDADD[7:0] and the control signals received by write control logic 111 and read control logic 121.

In accordance with the present invention, logic is included in the multi-queue FIFO memory system 100 to automatically generate the start and end addresses for each of the queues. This logic can be used to specify any number of queues in the design. The number of queues is written into a local or off-chip memory register. This value is read out upon receipt of a master reset signal. In one embodiment, a master reset signal and a programming signal are activated, and the desired number of queues is specified using the write queue address signal WRADDR[7:0] or the read queue address signal RDADDR[7:0], which is user selectable. When the master reset signal is de-activated, the write queue address signal (or the read queue address signal) is latched, thereby storing the desired number of queues.

The number of queues is presented to a look up table (LUT) to identify the amount of memory (e.g., the number of memory blocks) to be used in each queue. The LUT can be replaced with a divide function, which divides the total memory capacity (e.g., the total number of memory blocks) by the desired number of queues. Using the results of this divide function, the start and end addresses of each queue are determined and stored in queue start/end address register files. The queue start/end address register files associated with unused queues store null values. Initializing the start/end addresses of the queues in the foregoing manner enables proper memory read/write and flag counter operations. The present invention allows for local resetting, thereby saving system resources.

In one variation, equal queue depths are utilized (although this is not necessary). In this variation, a queue start/end address generator provides the same range of addresses for each queue. In another variation, the depth of each queue is stored in a memory to be utilized by the queue start/end address generator to determine a variable length queue. This last method can be implemented, for example, by serial programming.

Figure 2:
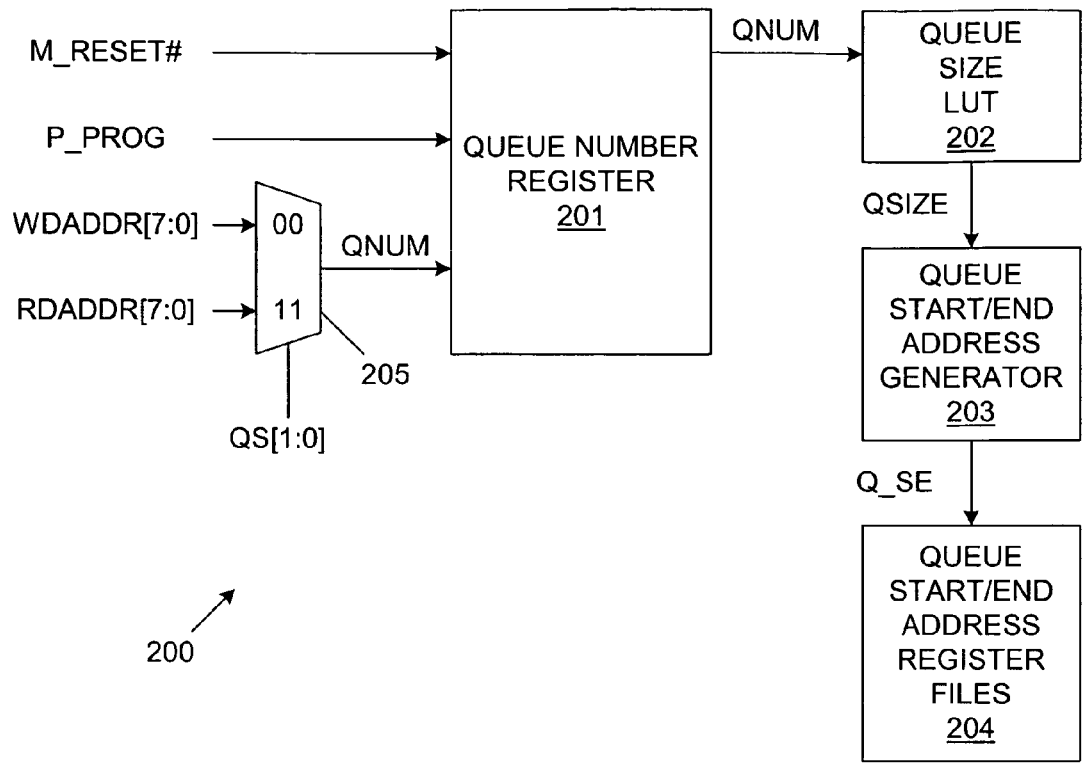
FIG. 2 is a block diagram of a default parallel programming system 200 in accordance with one embodiment of the present invention.

FIG. 2 is a block diagram of a default parallel programming system 200 in accordance with one embodiment of the present invention. Default parallel programming system 200 includes queue number register 201, queue size look-up table (LUT) 202, queue start/end address generator 203, queue start/end address register files 204 and multiplexer 205.

Figure 3:
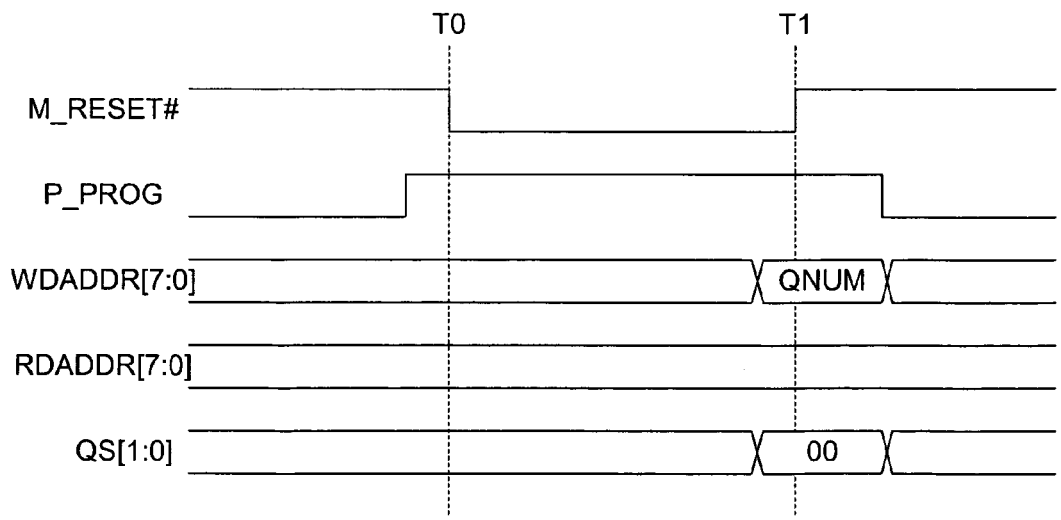
FIG. 3 is a waveform diagram illustrating the operation of the default parallel programming system of FIG. 2 in accordance with one embodiment of the described invention.

FIG. 3 is a waveform diagram illustrating the operation of default parallel programming system 200 in accordance with the described invention.

A master reset signal M_RESET# and parallel default programming signal P_PROG are applied to queue number register 201 as illustrated. The M_RESET# signal is provided from an existing pin of the multi-queue FIFO device 100, and therefore does not require any additional pin resources. Prior to time T0, the P_PROG signal is activated high, thereby enabling the default parallel programming mode. At time T0, the M_RESET# signal is activated low, thereby causing the configuration of multi-queue FIFO system 100 to be reset.

Prior to time T1, the user provides a queue select signal QS[1:0] having a value of "00" or "11" to the control terminals of multiplexer 205. In the described example, the queue select signal QS[1:0] has a value of "00". In response, multiplexer 205 routes the write address signal WDADDR[7:0] to queue number latch 201. Note that if the queue select signal QS[1:0] has a value of "11", then multiplexer 205 routes the read address signal RDADDR[7:0] to queue number latch 201.

Also prior to time T1, the user causes the write address signal WDADDR[7:0] to have a value representative of a user-defined number of queues to be implemented by multi-queue FIFO system 100. The write address signal WDADDR

[7:0] is provided from existing pins of the multi-queue FIFO device 100, and therefore does not require any additional pin resources. Multiplexer 205 routes the write address signal WDADDR[7:0] to queue number register 201 as the queue number value QNUM. The queue number value QNUM has a value between 0 and 127, inclusive. At time T1, the M_RESET# signal transitions to a logic "1" value, thereby indicating the end of the master reset operation. Queue number register 201 latches the QNUM value in response to the rising edge of the M_RESET# signal and the logic high state of the PROG signal.

Queue number register 201 provides the latched queue number value QNUM to queue size LUT 202. Queue size LUT 202 stores a default programming configuration for each of the possible queue number values QNUM. More specifically, for each queue number value QNUM (from 0 to 127), queue size LUT 202 stores a corresponding number identifying the amount of memory (e.g., number of memory blocks of the 512 total memory blocks) to be used in each queue. FIG. 4 is a block diagram illustrating the contents of queue size LUT 202 in accordance with the described embodiment. FIG. 4 illustrates the default size of each queue (in memory blocks) for each of the possible queue number values QNUM. For example, if the queue number value QNUM is equal to "19" (indicating that 20 queues should be implemented) queue size LUT 202 provides a queue size value equal to 25, thereby indicating that each of the 20 queues should include 25 of the 512 memory blocks. Queue size LUT 202 provides the number of memory blocks per queue as the queue size value QSIZE.

Queue start/end address generator 203 receives the QSIZE value, and in response, generates the start and end memory addresses for each of the queues. These start and end memory addresses are provided to queue start/end address register files as the Q_SE value. In the described example, queue start/end address generator 203 initially provides the 1$^{st}$ address of the 1$^{st}$ memory block. This address is stored as the start address of the first queue (i.e., queue 0). Queue start/end address generator 203 then provides the last address of the N$^{th}$ memory block, wherein N is equal to QSIZE. In the described example, queue start/end address generator 203 provides the last address of the 25$^{th}$ memory block. This address is stored as the end address of the first queue (i.e., queue 0).

Queue start/end address generator 203 then provides the first address of the (N+1)$^{th}$ memory block (e.g., the 26$^{th}$ memory block), which is stored as the start address of the second queue (i.e., queue 1). Queue start/end address generator 203 then provides the last address of the (2N)$^{th}$ memory block (e.g., the 50$^{th}$ memory block), which is stored as the end address of the second queue (i.e., queue 1). Processing continues in this manner until the start and end addresses of all 20 queues are stored in queue start/end address register files 204. Note that the start and end addresses of the unused queues 20-127 are left as null values in the present example.

Note that the total number of memory blocks may not be exactly divisible by the selected number of queues. For example, 20 queues having 25 memory blocks each would result in a total of 500 of the 512 memory blocks being used. In one embodiment, the left over memory blocks are simply not used. In another embodiment, the left over memory blocks are added to the last queue. Queue start/end address generator 203 can accomplish this by setting the last address of the last queue equal to the last address of the last memory block.

Figure 5:
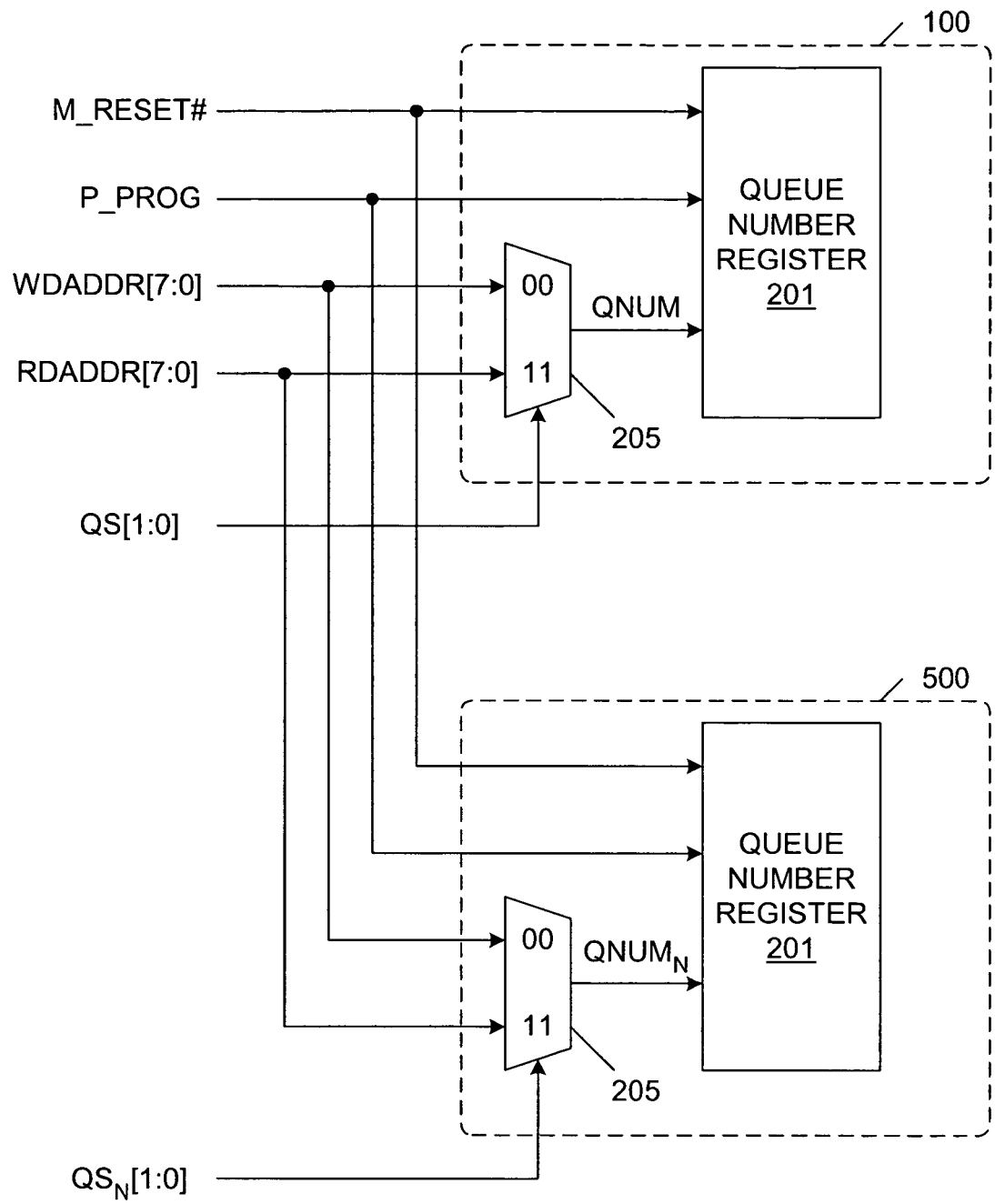
FIG. 5 is a block diagram illustrating portions of two multi-queue FIFO systems, which are programmed in accordance with another embodiment of the present invention.

FIG. 5 is a block diagram illustrating portions of two multi-queue FIFO systems 100 and 500, which are programmed in accordance with another embodiment of the present invention. Multi-queue FIFO system 500 is identical to multi-queue FIFO system 100, and functions to expand the capacity of multi-queue FIFO system 100.

Multi-queue FIFO systems 100 and 500 are coupled to receive the same master reset signal M_RESET#, the same programming enable signal PROG, the same write address signals WDADDR[7:0] and the same read address signals RDADDR[7:0]. However, multi-queue FIFO system 100 receives a first queue select signal QS[1:0], and multi-queue FIFO system 500 receives a second queue select signal QS$_N$[1:0].

Programming is performed in the manner described above. The first queue select signal QS[1:0] is selected to have a value of "00", such that the write address signal WDADDR[7:0] is routed as the queue number value QNUM in multi-queue FIFO system 100. However, the second queue select signal QS$_N$[1:0] is selected to have a value of "11", such that the read address signal RDADDR[7:0] is routed as the queue number value QNUM$_N$ in multi-queue FIFO system 500. Consequently, multi-queue FIFO systems 100 and 500 can be simultaneously programmed to have different number of queues. For example, if the write address signal WDADDR[7:0] (i.e., queue number value QNUM) has a value of 27, then multi-queue FIFO system 100 is configured to implement 28 queues, each having a capacity of 18 memory blocks. If the read address signal RDADDR[7:0] (i.e., queue number value QNUM$_N$) has a value of 100, then multi-queue FIFO system 500 is configured to implement 101 queues, each having a capacity of 5 memory blocks.

Advantageously, the present invention allows the automatic generation of the queue start and end address locations, given only the desired number of queues. In addition, the present invention advantageously does not require significant additional pin resources. Moreover, the present invention advantageously allows the desired number of queues to be communicated to the multi-queue FIFO system 100 in a parallel manner.

Although the invention has been described in connection with several embodiments, it is understood that this invention is not limited to the embodiments disclosed, but is capable of various modifications, which would be apparent to one of ordinary skill in the art. Thus, the queue programming method of the present invention can be used in combination with conventional programming methods, including, but not limited to, serial bit stream initialization and selecting the maximum number of queues. Thus, the present invention is only intended to be limited by the following claims.

We claim:

1. A multi-queue memory system comprising:
    a queue number register configured to store a queue number value identifying a desired number of queues in the multi-queue memory system;
    queue size logic coupled to receive the queue number value from the queue number register, wherein the queue size logic is configured to provide a queue size value in response to the queue number value, the queue size value identifying a memory capacity for each of the desired queues;
    a queue address generator for generating queue addresses for the desired queues in response to the queue size value; and
    a multiplexer coupled to a first bus and a second bus, the multiplexer being controlled to couple the first bus or the second bus to the queue number register in response to a first select signal.

2. The multi-queue memory system of claim 1, wherein the queue number value is a user-defined value.

3. The multi-queue memory system of claim 1, wherein the queue number register comprises:
   a first terminal for receiving a reset signal;
   a second terminal for receiving a program enable signal; and
   a first bus for receiving the queue number value, wherein the queue number register is configured to latch the queue number value in response to the reset signal and the program enable signal.

4. The multi-queue memory system of claim 3, wherein the reset signal is a master reset signal for resetting the entire multi-queue memory system.

5. The multi-queue memory system of claim 1, wherein the first bus is also configured to provide write address values during normal operation of the multi-queue memory system, and the second bus is also configured to provide read address values during normal operation of the multi-queue memory system.

6. The multi-queue memory system of claim 1, wherein the queue size logic comprises a look-up table that provides a queue size value in response to the queue number value.

7. The multi-queue memory system of claim 1, wherein the queue size logic comprises a divide function, which divides a total memory capacity of the multi-queue memory system by the desired number of queues.

8. The multi-queue memory system of claim 1, wherein each of the desired number of queues has the same memory capacity.

9. The multi-queue memory system of claim 1, wherein the queue address generator is configured to generate a start address and an end address for each of the desired queues.

10. The multi-queue memory system of claim 9, wherein the difference between the start address of a queue and the end address of the queue is selected in response to the queue size value.

11. The multi-queue memory system of claim 1, further comprising:
   a first bus configured to receive the queue number value during an initialization of the multi-queue memory system, and further configured to receive values used in accessing the multi-queue memory system after the initialization of the multi-queue memory system.

12. A method of configuring a multi-queue memory system comprising:
   storing a queue number value indicating the desired number of queues;
   determining a queue size value in response to the queue number value, wherein the queue size value identifies a capacity of each of the desired queues;
   generating queue addresses for the desired queues in response to the queue size value; and
   selecting the queue number value from a first value provided on a write address bus of the multi-queue memory system, or a second value provided on a read address bus of the multi-queue memory system.

13. The method of claim 12, further comprising storing the queue number value in response to a master reset signal of the multi-queue memory system.

14. The method of claim 12, wherein the queue size value is determined by applying the queue number value to a look-up table.

15. The method of claim 12, wherein the queue size value is determined by dividing a total memory capacity of the multi-queue memory system by the queue number value.

16. The method of claim 12, wherein the step of generating the queue addresses comprises:
   generating a start address associated with each of the desired queues;
   generating an end address associated with each of the desired queues; and
   storing each start address and each end address in a register file.

17. The method of claim 16, wherein the difference between the start address of a queue and the end address of the queue is selected in response to the queue size value.

* * * * *